United States Patent
Palvoelgyi et al.

(10) Patent No.: US 9,308,866 B2
(45) Date of Patent: Apr. 12, 2016

(54) GROUP OF EXTERIOR MIRRORS

(71) Applicants: Martin Palvoelgyi, Graz (AT); Bernhard Schadler, Oberrettenbach (AT); Reinhard Fuchs, Pischelsdorf (AT)

(72) Inventors: Martin Palvoelgyi, Graz (AT); Bernhard Schadler, Oberrettenbach (AT); Reinhard Fuchs, Pischelsdorf (AT)

(73) Assignee: MAGNA Auteca AG, Krottendorf/Weiz (AT)

( * ) Notice: Subject to any disclaimer, the term of this patent is extended or adjusted under 35 U.S.C. 154(b) by 286 days.

(21) Appl. No.: 13/828,002

(22) Filed: Mar. 14, 2013

(65) Prior Publication Data

US 2013/0242423 A1    Sep. 19, 2013

(30) Foreign Application Priority Data

Mar. 14, 2012  (EP) .................................. 12075027

(51) Int. Cl.
| | |
|---|---|
| G02B 5/08 | (2006.01) |
| B60R 1/072 | (2006.01) |
| B60R 1/074 | (2006.01) |
| G02B 7/182 | (2006.01) |
| B60R 1/076 | (2006.01) |

(52) U.S. Cl.
CPC .................. B60R 1/072 (2013.01); B60R 1/074 (2013.01); B60R 1/076 (2013.01); G02B 7/1828 (2013.01)

(58) Field of Classification Search
CPC ............ G02B 5/08; B60R 1/006; B60R 1/02; B60R 1/062; B60R 1/074; B60R 1/064
See application file for complete search history.

(56) References Cited

U.S. PATENT DOCUMENTS

| | | | |
|---|---|---|---|
| 2010/0060024 A1 | 3/2010 | Flynn et al. | |
| 2010/0238570 A1* | 9/2010 | Reedman | B60R 1/076 359/841 |
| 2010/0296185 A1 | 11/2010 | Itoh et al. | |
| 2012/0087026 A1* | 4/2012 | Schuurmans et al. | ........ 359/841 |

FOREIGN PATENT DOCUMENTS

| | | |
|---|---|---|
| CN | 1785717 A | 6/2006 |
| CN | 1938179 A | 3/2007 |
| CN | 1987598 A | 6/2007 |

OTHER PUBLICATIONS

Chao Fang, Chinese Patent Application No. 201310296254.8 Search Report, Jan. 16, 2015, 4 pages, Department of Mechanical Inventions under Patent Examination Cooperation Beijing Center, China (English translation included).

* cited by examiner

*Primary Examiner* — Scott J Sugarman
*Assistant Examiner* — Robert E Tallman
(74) *Attorney, Agent, or Firm* — Jordan IP Law, LLC; Todd A. Vaughn (57) ABSTRACT

A system of exterior mirrors having a mirror head and a mirror foot, the system including a first mirror which is configured to rotate about and also move vertically along a first axis defined by a first drive for the first mirror, and a second mirror which is configured to rotate about a second axis defined by a second drive for the second mirror.

20 Claims, 5 Drawing Sheets

GROUP OF EXTERIOR MIRRORS

CROSS-REFERENCE TO RELATED APPLICATIONS

The present application claims priority under 35 U.S.C. §119 to European Patent Application No. 12075027.8 (filed on Mar. 14, 2012), which is hereby incorporated by reference in its entirety.

TECHNICAL FIELD

Embodiments are directed to a group of exterior mirrors having a mirror head and a foot.

BACKGROUND

EP 2 230 131 B1 discloses a group of exterior mirrors that comprises a mirror with an electric drive and a mechanical mirror. In such mirrors, a mirror foot and a mirror head are connected pivotably to each other, whereby the mirror head has a mirror housing. An electric drive or mechanical components, such as compression springs and a sleeve of the mechanical mirror, the sleeve predetermining the axis of rotation, are inserted into the mirror housing from the side remote from the mirror foot and are connected to the mirror foot. Detents which define the driving position for the mirror are arranged on the mirror housing at the mirror foot.

SUMMARY

In accordance with embodiments, a group of exterior mirrors or an exterior mirror system is provided which includes a mirrors with electric drives having different functions, and in which a plurality of components of identical geometry is useable in the different mirrors.

In accordance with embodiments, a system of exterior mirrors having a mirror head and a mirror foot is provided, the system including at least one of the following: a first mirror with an electric drive and which has a function of lift and turn, and a first and second detent for fixing the driving position of the mirror head; and a second mirror with an electric drive and which has a function of turn, and a first and second detent of the mirror head.

In accordance with embodiments, the mirror head of the respective mirrors includes a mirror housing into which the respective drives and the components of the mechanical mirror may be inserted from the side remote from the mirror foot. The electric drives of the first and of the second mirror are identical in the construction thereof and include a gearwheel driven via an electric motor, a foot part which may be connected to the mirror foot and has an annular extension which faces the gearwheel and has a contour, an axially displaceable bracing ring which is connected to the foot part for rotation therewith and has supporting contours for at least one projection arranged on the gearwheel and, on the side remote from the supporting contours, has at least one latching element. The bracing ring with the supporting contours and the projection of the gearwheel realize the respective first detent.

The mirror housing of the first mirror has at least one mating latching element facing the mirror foot, which likewise comprises at least one latching element, and a smooth surface remote from the mirror foot. For the first mirror, the second detent is realized by the latching element on the mirror foot and the mating latching element on the mirror housing, and the function of lift is realized by releasing the second detent via the supporting contours of the bracing ring in conjunction with the contour on the annular extension of the foot part.

The mirror housing of the second mirror has at least one mating latching element remote from the mirror foot and a smooth surface facing the mirror foot. For the second mirror, the second detent is realized by the at least one latching element on the bracing ring and the at least one mating latching element on the mirror housing, as a result of which the mirror housing is not lifted.

In the case of a mechanical mirror, at least some of the mechanical components are matched to the mirror housing of the first mirror or to the mirror housing of the second mirror.

The group of exterior mirrors may also include a third, mechanical mirror which has a spring-loaded detent, which corresponds to the second detent and may be referred to in this manner, and an identical foot part and a spacer sleeve for engaging around the foot part. In this case, the spacer sleeve is formed with at least one latching element which corresponds to that of the bracing ring. The foot part and the spacer sleeve are components of a mechanical mirror insert which may be inserted into one of the mirror housings of the first and of the second mirror, wherein the second detent is formed by the at least one latching element of the spacer sleeve and by the at least one mating latching element of the mirror foot or of the mirror housing.

Because the electric drives and the mechanical mirror insert may be inserted axially into the mirror housing from above, i.e., opposite the mirror foot, the compression spring which is used in all of the components and, for the electric drives, may be accommodated internally or otherwise externally with respect to a drive housing. In this way, the compression spring always exhibits a force which presses the mirror housing of the mirror head against the mirror foot. Meaning, that a mechanical connection such as a screw connection between the mirror housing and the respective drives or the mechanical components is no longer necessary, i.e., the stability of the mirror head is no longer dependent on a screw connection. A screw connection may be advantageously provided, however, to enable a fixed connection between the particular drive or the mechanical components and the mirror housing of the mirror head due to the connection redundancy.

Because the actual drive of the first and second mirror is formed identically for the function of lift and turn and that of the double detent and for the function only of turn and of the double detent, and the respective functions depend merely on the design of the mirror housing, the same drive and the same mirror foot may always be used, and whether the head lifts or does not lift is determined only by the configuration of the mirror housing of the mirror head.

By provision of the second detent between the mirror foot and the mirror housing, it is possible, in conjunction with the drop contours of the bracing ring and the contour of the annular extension of the foot part, to realize the function of lift of the mirror head by releasing the detent and lifting the mirror housing and the bracing ring while, by provision of the second detent between the mirror foot and the bracing ring, the function of lift of the mirror head is not realized, since the mirror housing is unaffected.

Since, for a mirror that may be manipulated manually, one of the two mirror housings of the electric drives may be used. Thus, a mechanical mirror may be converted into a mirror which may be folded down electrically by the mechanical mirror insert being replaced by one having an electric drive.

A double detent is intended to be understood as meaning that a first detent is predetermined in the form of a stop or catch in the driving position for electric operation of the mirrors and, in the manual case, i.e., in the case in which, on manual unfolding out after the mirror has been electrically folded in, i.e., has been brought into the parking position, a detent which constitutes the second detent is intended likewise to be found for the driving position.

In accordance with embodiments, the group of mirrors may have identical drives, and therefore, components for the mirrors having different functions, i.e., also with manual unfolding out and folding in, may be saved and the required outlay on storage may be reduced.

Identical components for the respective electric drives may be used by virtue of the fact that, in the case of the mirror housing of the first mirror, the at least one latching element of the bracing ring and of the spacer sleeve is designed to slide on the flat surface of the mirror housing, and, in the case of the mirror housing of the second mirror, the at least one mating latching element of the mirror foot is designed such that the flat surface of the mirror housing may slide thereon.

In accordance with embodiments, the mirror head is pivotable about an axis of rotation, and a compression spring engaging around the axis of rotation presses the mirror housing of the mirror head against the mirror foot.

Advantageously, locking elements are provided on the foot part of the drive of the first and second mirror in order to form a bayonet connection with second, corresponding locking and positioning elements on the mirror foot. The connection of the particular drive to the mirror housing with the mirror foot may thereby be improved. All customary types of mirror head fastening may also be used, however, such as, for example, a hollow rivet which is wobbled during installation, a sleeve which is screwed to the mirror foot, or a sleeve cast on the mirror foot.

Because the bracing ring of the drive of the first and second mirror is arranged with the foot part for rotation therewith, but in an axially displaceable manner with respect thereto, the driving gearwheel is carried along during the manual unfolding out of the electric folded-in position by the self-locking of the gearing and moves onto the lifted bracing ring, thus strongly pretensioning the compression spring and, when the driving position is reached, bringing about the detent with the foot part or the mirror housing. On the next electric actuation, the output gearwheel is advantageously rotated on the bracing ring until said output gearwheel reaches its starting position again.

For a structurally simple, non-rotatable connection between the annular extension of the foot part and bracing ring that at the same time permits axial displacement, guide elements are arranged on the annular extension and on the bracing ring. The guide elements may be formed firstly as slots provided in the cylindrical walls of the annular extension and secondly as elevations directed inwards on the bracing ring, in which the elevations are guided in the slots. It is also conceivable, however, for axially directed elevations to be arranged on the cylindrical outer surface of the annular extension, the elevations cooperating with corresponding depressions on the bracing ring. The spacer sleeve of the manual mirror is also formed with guide elements in a corresponding manner.

The bracing ring and the foot part are advantageously arranged with respect to each other in such a manner that the bracing ring engages around the annular extension. This also applies for the spacer sleeve of the manual mirror.

It is particularly advantageous that, for the electric drives, the contour of the annular extension and the supporting contour of the bracing ring are matched in the levels thereof to each other in such a manner that, in the driving position of the mirror head, the at least one projection of the gearwheel rests on the supporting contour of the bracing ring in order to transmit the force of a pretensioning compression spring via the mirror housing to the mirror foot. On excitation of the motor for moving the mirror head into the parking position thereof, the gearwheel runs with the at least one projection onto the contour of the annular extension of the foot part depending on a free movement of the gearwheel with respect to the bracing ring, and the bracing ring may be lifted axially in order to release the second detent. In this case, the free movement is predetermined by the contour of the annular extension and the drop contour of the bracing ring.

In accordance with embodiments, in the arrangement of the bracing ring, which is non-rotatable with the foot part but is moveable axially with respect thereto, and of the annular extension of the foot part, the projections of the output gearwheel rest on the supporting contour of the bracing ring in the driving position. This ensures a secure detent between the mirror housing and foot part and between the bracing ring and the mirror housing, since the force of the compression spring is transmitted directly via the bracing ring and the mirror housing to the mirror foot and via the bracing ring to the mirror housing. Due to the fact that, during the transfer of the mirror head from the driving position into the parking position, the gearwheel first of all passes through a free movement. As a result of which the projections of the gearwheel are moved onto the annular extension, the force is directly absorbed by the annular extension, which is part of the foot part, and therefore, the bracing ring and mirror housing are freed from the force of the compression spring. Moreover, as a result, since the projections of the gearwheel each strike against a stop of the contour of the annular extension, the mirror housing is moved about the output gearwheel and the bracing ring and the mirror housing, or only the bracing ring may be lifted axially in order to release the detent.

A structural possibility is therefore made available to divert the force of the spring before or during the folding movement such that said force no longer acts on the mirror head. The required electric power which, at a constant voltage by means of the current, is intended to move the mirror is thereby greatly reduced.

In order for the particular electric drive of the first and of the second mirror, to ensure a diversion of the force of the compression spring from the bracing ring to the annular extension of the foot part, and vice versa, the contour of the annular extension, which contour is formed in the end surface of the extension, is at a higher level with respect to the supporting contour of the bracing ring in the region of the free movement of the gearwheel. As a result, on excitation of the motor, the gearwheel is moved in a structurally simple manner onto the contour or the end surface of the annular extension.

DRAWINGS

Embodiments are illustrated in the drawings and are explained in more detail in the description below.

DESCRIPTION

Figure 1:
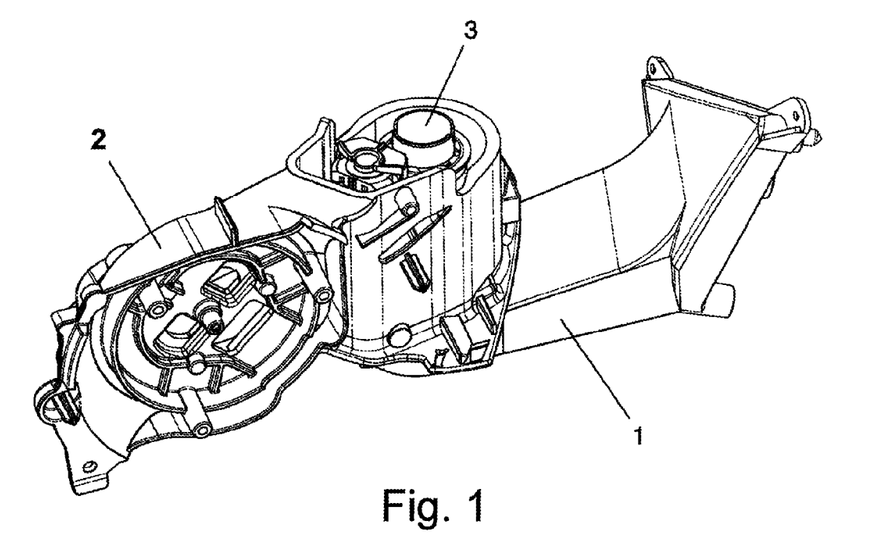
FIG. 1 illustrates a perspective view of a mirror housing which is fastened pivotably to the mirror foot and has an electric drive.

As illustrated in FIG. 1, embodiments of a vehicle exterior mirror are provided and include a mirror foot 1 which may be operatively connected, attached or fastened to a motor vehicle body. A mirror housing 2 is pivotable with respect to the mirror foot 1 and to which, inter alia, a mirror glass may be operatively connected, attached or fastened. A driving unit 3 with a folding-down drive, a compression spring 5 and a sleeve 6 (explained further hereinbelow) which forms an axis of rotation of the mirror housing 2 about the mirror foot 1.

Figure 2:
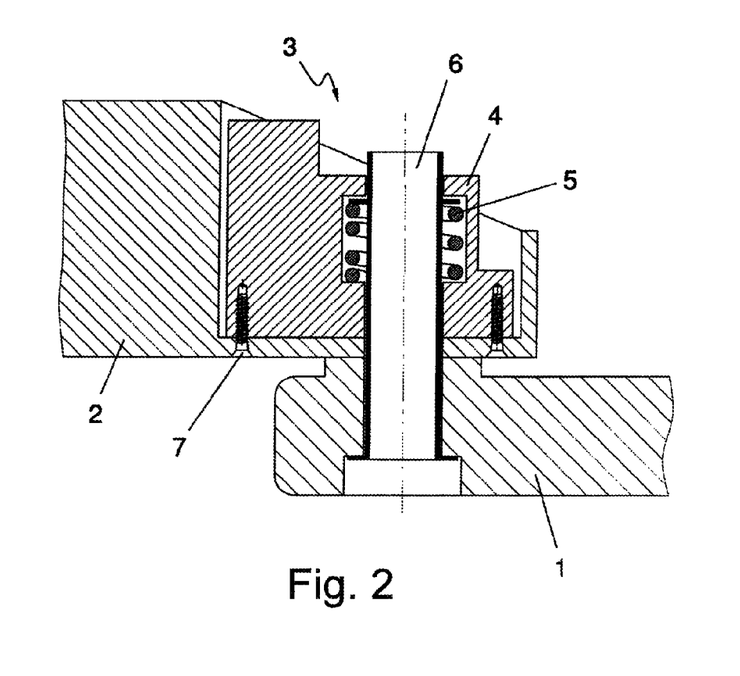
FIG. 2 illustrates a partial sectional view through the mirror housing, mirror foot and electric drive for illustration of an installation from above.

The manner of installation of the components illustrated in FIG. 1 is illustrated in FIG. 2. In this case, the driving unit 3, which has a folding-down drive 4, a compression spring 5 and a tubular sleeve 6, is inserted as a unit from above, i.e., from the side remote with respect to the mirror foot 1, into the mirror housing 2 and the mirror foot 1 and operatively connected, attached or fastened to the mirror foot 1 via, such as for example, a bayonet connection. The compression spring 5 yields a force to press the mirror housing 2 against the mirror foot 1, as a result of which the stability of the mirror head, which includes the mirror housing 2, is no longer dependent on a screw connection. In order, however, to obtain an even stronger connection between the folding-down drive 4 and the mirror housing 2 of the mirror head, screw connections 7 may be provided to operatively connect, attach or fasten the mirror housing 2 and the drive 4.

As illustrated in FIG. 2, the compression spring 5 is accommodated within the drive 4. Embodiments, however, are not limited to such an arrangement, and thus, may reasonable include another arrangement such as for example, in which the compression spring 5 is located outside the drive 4 and presses onto the drive 4 from above.

Figure 3:
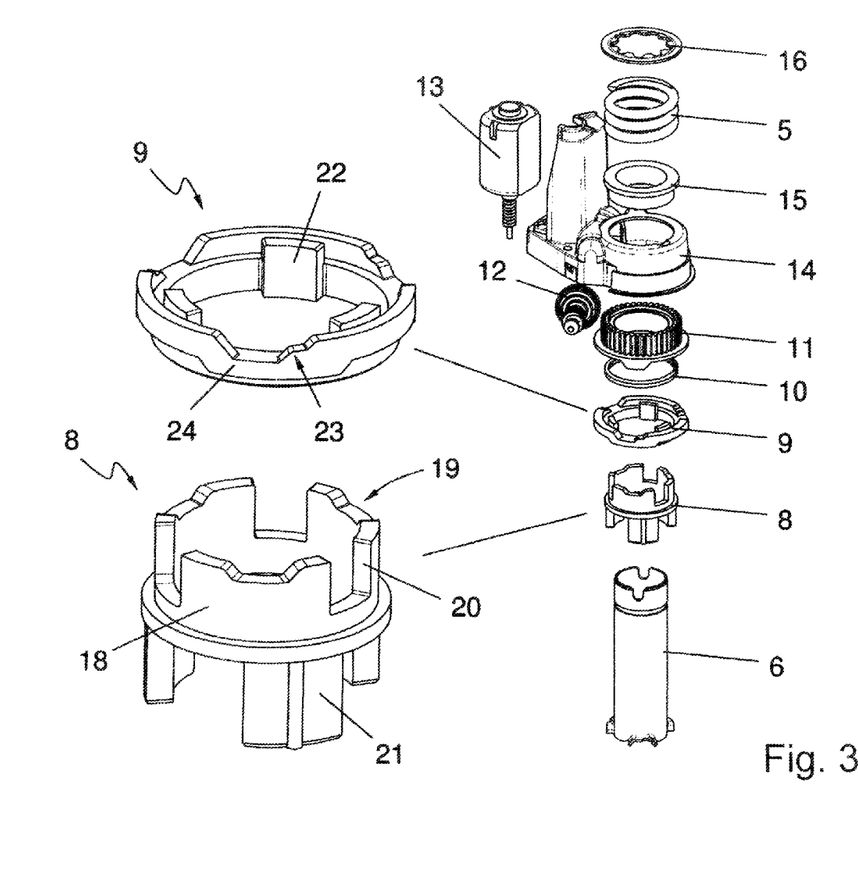
FIG. 3 illustrates an exploded view of the electric drive used in the first and in the second mirror, without the mirror housing.

As illustrated in FIG. 3, a driving unit 3 in accordance with embodiments is provided in an exploded illustration. The individual components are the tubular sleeve 6 which is operatively connected attached or fastened to the mirror foot 1, a foot part 8 (which is also illustrated in enlarged form), a bracing ring 9 (which is likewise illustrated in enlarged form), a biasing mechanism such as, for example, a weak compression spring 10, an output gearwheel 11 which may be driven by an electric motor 13 via an intermediate shaft 12, a drive housing 14 defining a passage opening to receive at least the sleeve 6, the output gearwheel 11, the intermediate shaft 12 and the motor 13, a spring support 15 for a second bias mechanism such as, for example, a compression spring 5, and a clamping disc 16 operatively connected attached or fastened to the sleeve 6. In accordance with embodiments, the compression spring 5, foot part 8, bracing ring 9, weak compression spring 10, output gearwheel 11, drive housing 14, spring support 15 and clamping disc 16 are respectively configured to engage around the sleeve 6 which is connected to the mirror foot 1.

Figure 4:
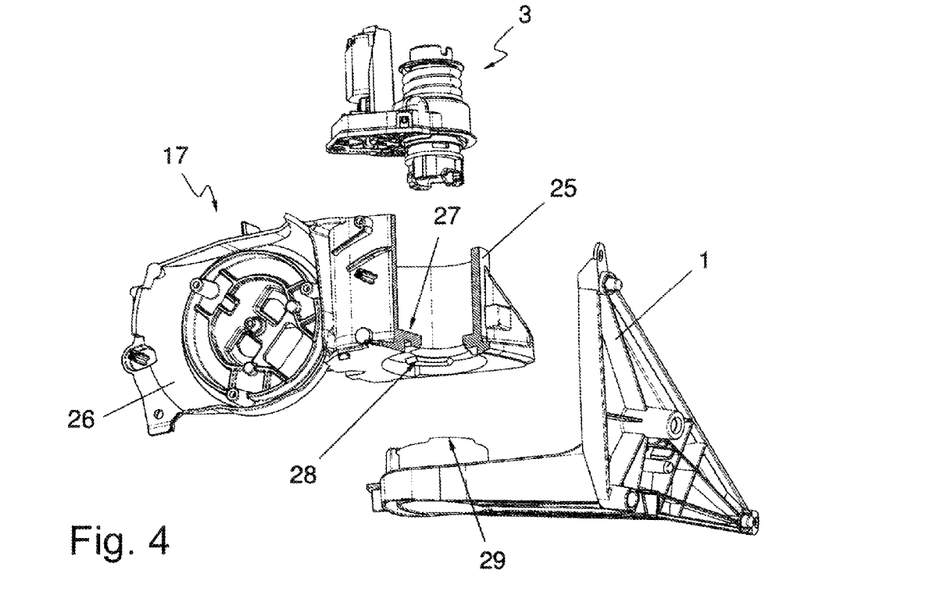
FIG. 4 illustrates the components of a first mirror with an electric drive, mirror housing and mirror foot in a perspective exploded illustration and with an enlarged view of the foot part and of the bracing ring.

As illustrated in FIG. 4, the individual components of a first mirror which includes a double detent for the setting of the mirror head in a driving position and the function of lift and turn. The drive unit 3 is inserted from spatially above into a mirror housing 17, which is assigned to the first mirror, in such a manner that part of the drive unit 3 reaches through a passage hole in the mirror housing 17 and may be connected to the mirror foot 1.

In order to explain the function of the drive unit 3 with respect to the mirror housing 17, reference is once again made to FIG. 3. The foot part 8 has a substantially cylindrical annular extension 18 which extends in the axial direction and which is provided on the distal end surface thereof with a contour 19 (explained further hereinbelow) and which, in the cylindrical wall thereof, has a plurality of recesses or slots 20, in the present case three, which are incorporated in the axial direction. Furthermore, the foot part 8 is provided with circumferential positioning extensions 21 which engage in the mirror foot 1, but the function of which is not explained further here.

The bracing ring 9 according to FIG. 3, which bracing ring engages around the annular extension 18 of the foot part, has, on the inner surface thereof, inwardly directed guide elements 22 which correspond to the slots 20 of the annular extension and form axial guides with said slots. By means of said guides 22, 20, the bracing ring 9 is connected to the foot part 8 for rotation therewith, but is moveable axially with respect thereto. A supporting contour or supporting contours 23 (explained more precisely later) is or are formed on the upper side, i.e. on the end surface of the bracing ring 9 facing the output gearwheel 11. Furthermore integrally formed thereon are latching elements 24 which are directed downwards, i.e. are directed towards the mirror foot.

The motor 13 via the intermediate shaft 12 drives the output gearwheel 11 which is stationary apart from a free movement (described hereinbelow), and therefore, on excitation of the motor 13 and corresponding transmission of the movement of the motor 13 via the intermediate shaft 12 to the gearwheel 11, the associated mirror housing 17 moves together with the housing 14 of the drive 4 about the axis of rotation, i.e., about the sleeve 6.

As illustrated in FIG. 4, the mirror housing 17 has a first housing part 25 in which the drive unit 3 is accommodated, and a second housing part 26 which, inter alia, supports the mirror glass. In accordance with embodiments, the passage hole for the sleeve 6 of the drive unit 3 is surrounded by a border region, the surface 27 of which facing the drive is smooth and flat. Mating latching elements 28 and mating latching contours 29 are arranged on that surface of the border region of the passage hole of the mirror housing 17 that is directed towards the mirror foot 1. The mirror foot 1 is provided with an extension with latching elements and latching contours 29. In this case, the latching contour 29 of the mirror foot 1 and the mating latching elements 28 of the mirror housing 17 form a detent. The shown detent, i.e., the latching contour 29 and the mating latching elements 28, has a plurality of elevations and depressions which fit in each case one inside another. In this case, three elevations are distributed uniformly over the circumference (120° with respect to one another). The detent is likewise arranged in such a manner that it may come into engagement when the mirror head is in the driving position. There are theoretically still other positions into which the detent may come into engagement (all 120°), but these positions are located outside the pivoting range of the mirror head. There is in practice, therefore, only one position in which the detent system may come into engagement and this is in the driving position.

The manner of operation of the lift and turn and the detent or detents will be described in more detail with reference to FIG. 5a and FIG. 5b, which illustrate the drive unit 3 and components thereof in a first position of the mirror housing 17 as a moveable part with respect to the fixed part of the first mirror, which part is formed by the mirror foot 1, and in which this position is the driving position. The detent between the mirror foot 1 and mirror housing 17 customarily has a plurality, such as for example, three, latching elements 29 and mating latching contours 28 over the circumference. The latching elements 29 on the mirror foot 1 have elevations with a flat surface and/or oblique side surfaces or ramps, and the corresponding mating contours 28 of the mirror housing 17 have a corresponding shape. The bracing ring 9 which is guided in the annular extension 18 of the foot part 1 is provided with the supporting contour 23, which is directed towards the gearwheel 11, and furthermore, has the latching element or the latching elements 24 which rests or rest on the flat and smooth surface 27 of the border region of the passage opening in the mirror housing 17.

The supporting contours 23, of which there are likewise three, are distributed over the circumference, and are designed as a graduated indentation which includes a low region and a step with a spatially higher level with respect thereto, which region and step are in each case connected by oblique surfaces. The gearwheel 11 which is pressed onto the bracing ring 9 by the spring force 30 has three projections 31 on a side thereof which faces the bracing ring 9. The projections 31 in each case rest on the step with the spatially higher level of the supporting contour 23 and have a stop by way of an oblique surface. The projection 31 together with the step of higher level in the indentation and the oblique surface in the form of a stop form a "detent" of the gearwheel 11 together with the bracing ring 9 in the driving position of the mirror head. The annular extension 18 and the contour 19 thereof have three depressions which are distributed over the circumference and substantially or largely correspond to the supporting contours 23 of the bracing ring 9 in the position of said contours on the particular circumference.

In the driving position illustrated in FIG. 5a, the step of the graduated region of the supporting contour 23 of the bracing ring 9 lies at a spatially higher level with respect to the base of the depression of the annular extension 18 of the foot part, and therefore, as already noted, the projections 31 of the output gearwheel 11 direct the spring force 30 of the compression spring 5 onto the bracing ring 9, the mirror housing 17 and onto the mirror foot 1. As a result, the mirror housing 17 and the mirror foot 1 are securely connected to each other by the detent, and the compression spring 5 and the geometry of the detent 28, 29 are configured in this case in such a manner that the motor 13 is too weak in order to release the detent.

FIG. 5b illustrates the folding-in operation of the mirror. The motor 13 is energized at the beginning of the folding-in operation, and the mirror housing 17 with the correspondingly accommodated moveable components of the folding-in drive 4 may not move because of the detent between the mirror housing 17 and mirror foot 1. The output gearwheel 11, however, initially does not have a stop counter to the folding-down or folding-in direction in order to apply the supporting moment. The output gearwheel 11, therefore, has a certain free movement with respect to the bracing ring 9. The output gearwheel 11 now rotates counter to the folding-down direction until the projections 31 each move away from the step of the graduated region of the supporting contour 23 and are then supported in each case on the base of the depression of the contour 19 of the annular extension 18. As a result, the spring force 30 of the compression spring 5 is now supported by the cylindrical annular extension 18 of the foot part 8. In this case, it should be taken into consideration that the base of the depression of the contour 19 of the annular extension 18 lies at a spatially higher level than the base of the supporting contour 23 of the bracing ring 9.

Since the spring force 30 now acts directly on the annular extension 18 and the foot part 8, the mirror housing 17 and the bracing ring 9 may migrate upwards without impediment and the detent between the mirror housing 17 and mirror foot 1 may be released. This makes it possible to fold down the mirror head with respect to the mirror foot 1.

As illustrated in FIG. 5b, the bracing ring 9 and the mirror housing 17, and therefore the rest of the drive 4, i.e., the motor 13 and the intermediate shaft 12 and the like, and also the mirror head, have been lifted and the mirror housing 17 moves around the fixed output gearwheel 11 in the direction of the arrow 32 drawn in. As a result, the lift and turn function is realized. The bracing ring 9 has been displaced upwards via the axial guide 20, 22. The lifting height of the bracing ring 9 is determined via the ramp height of the detent of the mirror housing 17 with the mirror foot 1. In the lifted state, the spring force 30 continues to act directly on the mirror foot 1, i.e., play is provided between the bracing ring 9 and the projections 31 of the output gearwheel 11. The spring force 30 only acts on the bracing ring 9 in the event of the detent in the driving position or in the event of a manual adjustment. The mirror housing 17 together with the moveable components of the drive moves into the parking position until the movement of the mirror housing is ended by a stop predetermining the parking position.

If the mirror head is then intended to be unfolded again electrically, the motor 13 is correspondingly activated, with the slope, which acts as a stop, of the graduated region of the drop contour 23 of the bracing ring 9, thereby preventing premature passage through the free movement of the output gearwheel 11. The mirror housing 17 together with the moveable components of the drive 3 then moves out of the parking position into the driving position counter to the direction indicated by 32 in FIG. 5b. Only when, because of the movement mentioned, the detent between the mirror housing 17 and the mirror foot 1 comes into engagement again is the free movement passed through and the output gearwheel 11 moves again onto the bracing ring 9 or onto the step of the graduated region of the drop contour 23. The spring force 30 acts again on the mirror housing 17, and therefore, tensions the mirror housing 17 against the mirror foot 1. Since the motor 13 is configured in such a manner that it is too weak to release the detent, the drive remains in this position which is the driving position.

If a user intends to unfold the mirror head manually out of the electric folded-in position into the driving position, the output gearwheel 11 is carried along by the self-locking of the gearing together with the mirror housing, i.e., including driving components and mirror head, and is moved from the drop contour 23 of the annular extension 18 onto the bracing ring 9. By way of this upwards movement, the compression spring 5 is heavily pretensioned, as a result of which the spring force 30 is now greater than in the previous states. When the driving position is reached by the manual movement, the mirror housing 17 latches again to the mirror foot 1, wherein the output gearwheel 11 remains with the projections 31 thereof on the upper border of the bracing ring 9. The projections 31 of the output gearwheel 11 therefore rest only on the bracing ring 9 and not at the same time on the annular extension 18 of the foot part 8. This is also the case when the mirror head reaches the driving position and the detent contour 28 of the mirror housing 17 and the latching elements 29 of the mirror foot 1 come into engagement.

Upon the next electrical actuation, the output gearwheel 11 is rotated further until it again reaches the drop contour 23 on the bracing ring 9 and therefore the starting position.

In accordance with embodiments illustrated and described in FIGS. 5*a* and 5*b*, the latching projections 24 on the bracing ring 9 do not have any function or slide on the flat surface 27 of the mirror housing 17.

Figure 5:
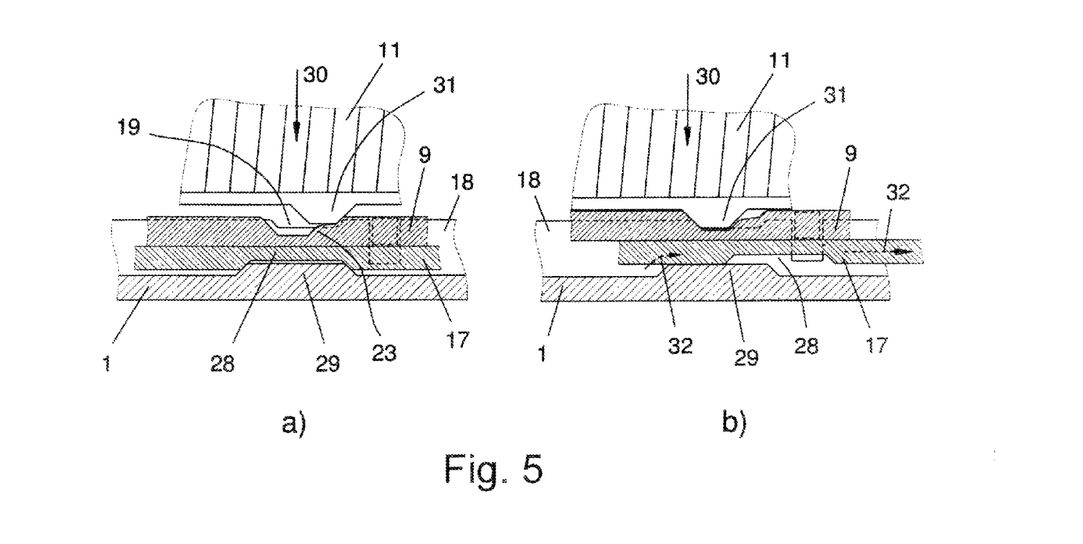
FIG. 5 illustrates partial views of the developed views of the drive, of the mirror housing and of the mirror foot of FIG. 4 in the driving position and during a folding-down movement into the parking position.
Figure 6:
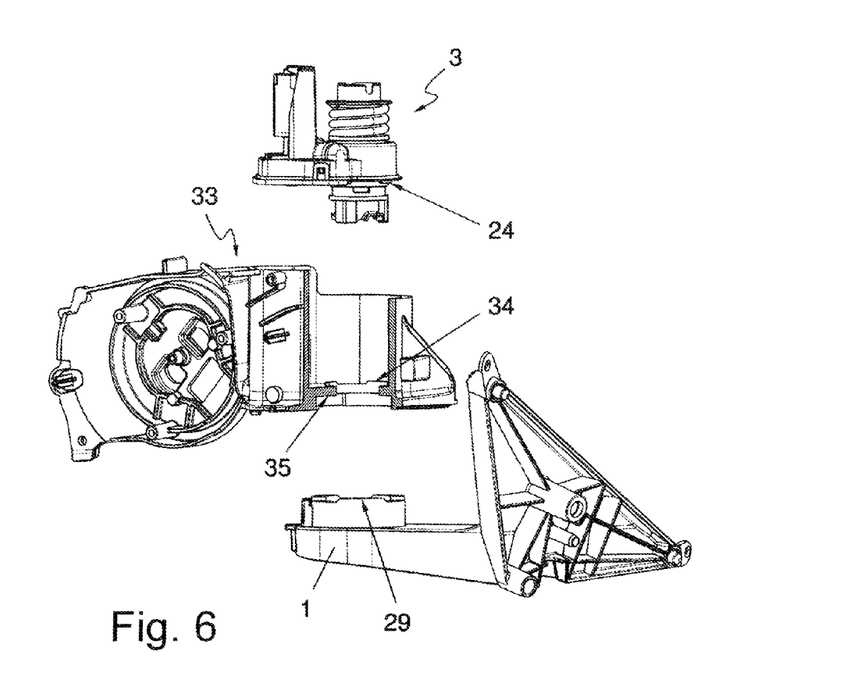
FIG. 6 illustrates the components of an electric drive, mirror housing and mirror foot of the second mirror in an exploded illustration.
Figure 7:
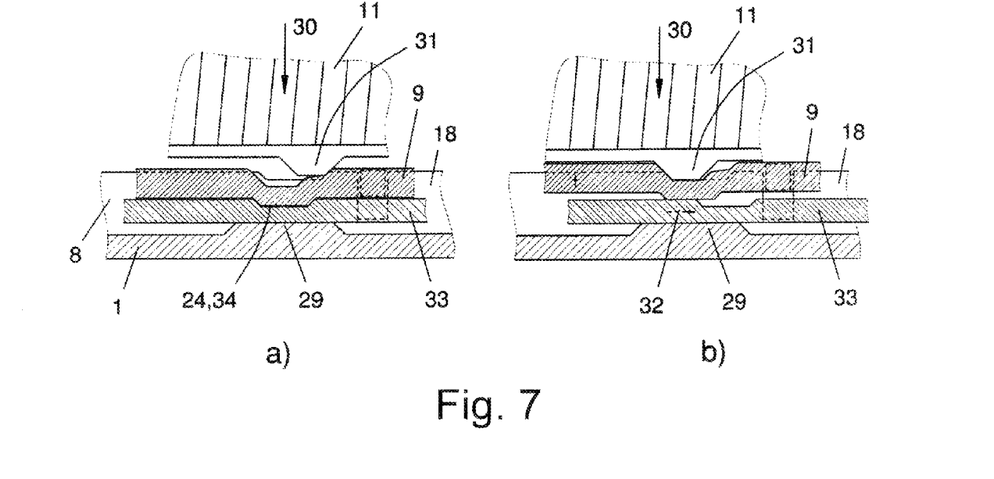
FIG. 7 illustrates partial views of developed views of FIG. 5 for the second mirror.

As illustrated in FIGS. 6 and 7, the components of the second mirror are illustrated in views which correspond to FIGS. 4 and 5. The drive unit 3 and the mirror foot 1 are constructed in the same manner as in the case of the first mirror of FIG. 4. The mirror housing 33 merely differs from the mirror housing 17 in that the surface 35 of the border surrounding the passage hole, which surface faces the mirror foot 1, is flat and smooth and the surface of the border region, which surface faces the bracing ring 9 of the drive unit 3, has latching contours 34.

FIGS. 7*a* and 7*b* illustrate developed views of components of the mirror in the driving position and during the folding-down or folding-in into the parking position. By contrast to FIG. 5*a*, in the case of the second mirror of FIG. 7*a*, the mirror housing 33 is not latched to the mirror foot 1 but rather the detent contour 29 of the mirror foot 1, which contour is designed as a flat surface with two ramps, slides along the lower side of the mirror housing 33 or rests on this flat, smooth surface. In this exemplary embodiment, there is a detent at the intersection between the bracing ring 9 and the mirror housing 33, i.e., the latching element 24 of the bracing ring 9 engages in the latching depression 34 on that side of the border region which is opposite the mirror foot 1. The driving position is now determined via the bracing ring 9 which is connected to the mirror foot 1 for rotation therewith via the annular extension 18 of the foot part 8. Otherwise, the manner of operation is identical, i.e., the projections of the gearwheel 11 rest on the raised step of the drop contour 23 of the bracing ring, in which a stop of the drop contour 23 defines the driving position.

If the mirror head is intended to be moved into the parking position, first of all, the motor 13 is energized and, because of the free movement of the gearwheel 11, the projections 31 move onto the contour 19 of the annular extension 18, as a result of which the spring force 30 of the compression spring 5 is directed onto the annular extension of the foot part 8 and therefore onto the mirror foot 1. The mirror housing 33 may move, and therefore, the detent 24, 34 between the mirror housing 33 and bracing ring 9 is released and the bracing ring 9 is displaced axially. The mirror housing 33, and therefore the mirror head, retains its initial height, and therefore the function of lift is not carried out.

As in the embodiments illustrated in FIG. 5, the mirror head or the mirror housing 33 moves into the parking position, and, if the mirror is intended to be unfolded again, the operation corresponds to the operation which has been described previously. During the manual unfolding, after the mirror head has been brought into the parking position via the electric drive, the output gearwheel 11 is again carried along by the self-locking of the gearing together with the mirror housing 33, wherein the output gearwheel 11 runs out of the contour 24 of the annular extension 18 onto the bracing ring 9. When the driving position is reached, i.e., when the latching contours 24, 34 on the bracing ring 9 and on the mirror housing 33 correspond again, the two components latch.

The components of the first mirror according to FIG. 4 and FIG. 5 and of the second mirror according to FIG. 6 and FIG. 7 therefore correspond except for the design of the mirror housing 17 and of the mirror housing 33, and therefore, two mirrors having different functions may be made available with use only of a different mirror housing.

Figure 8:
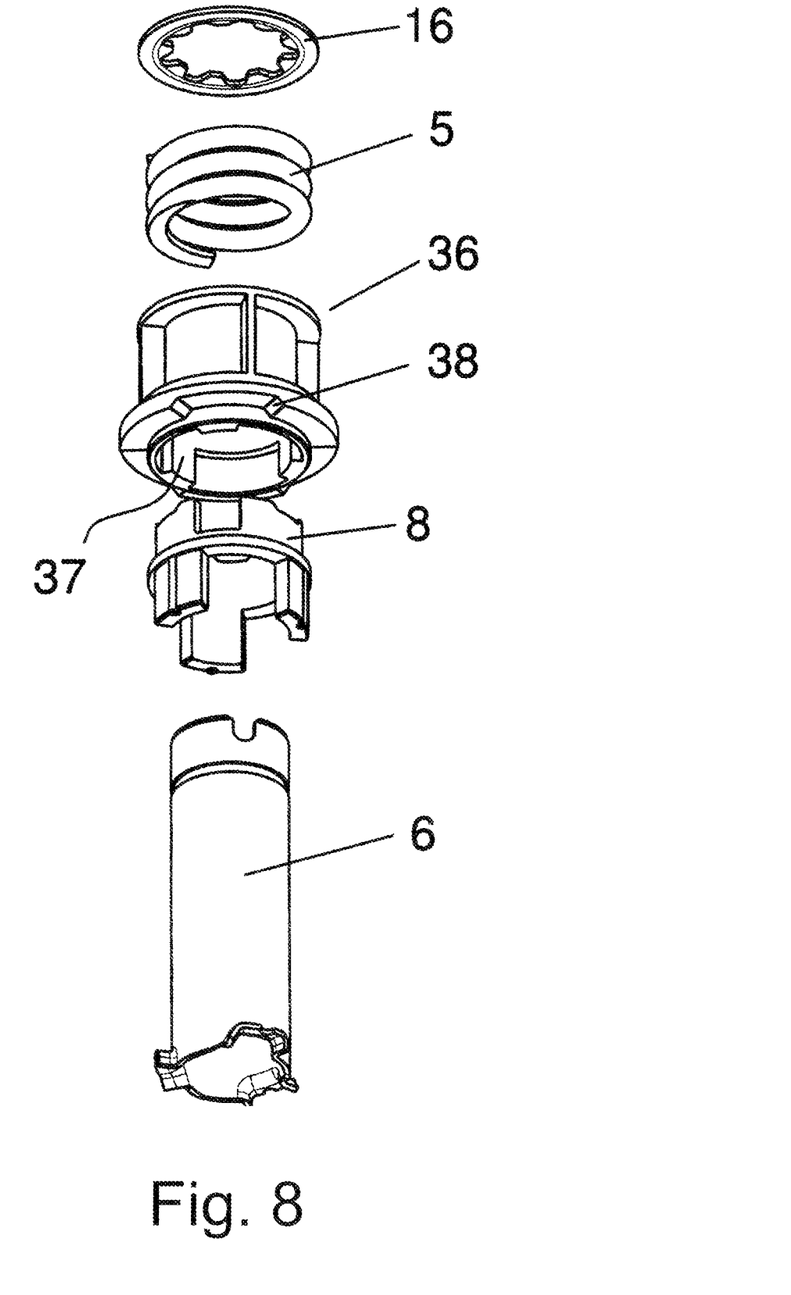
FIG. 8 illustrates components of a mechanical mirror in an exploded illustration.

FIG. 8 illustrates the individual components of a manual insert which replaces the above-described electric drive in the case of a mechanical mirror. The components—a clamping disc 16, compression spring 5, foot part 8 and bayonet sleeve 6, are the same components as present in the electric drive. In addition, a spacer sleeve 36 is provided, the spacer sleeve 36 being a component which is present only in the mechanical mirror. The spacer sleeve 36 is preferably manufactured from plastic and is guided axially in the foot part 8 and, on its inner circumference, has the same guide elements 37 and, on its lower side, the same latching elements 38 as those of the bracing ring 9 on its inner circumference and its lower side. One advantage of the axial guide is that the compression spring 5 is not exposed to any torque during operation, which may avoid noise being produced.

The described manual insert which, except for the spacer sleeve 36, uses identical components as in the case of the first and second mirror with the electric drive, may be used both with a mirror housing 17 of the first mirror and with a mirror housing 33 of the second mirror. In the case of the first mirror with lift and turn, the latching elements 38 of the spacer sleeve 36 do not have a function and the spacer sleeve 36 serves only to imitate the overall height of the electric drive in order to be able to use substantially identical components. In the case of the second mirror without lift and turn, the spacer sleeve 36 additionally takes on the function of the bracing ring 9 and, in interaction with the latching depressions 34 in the mirror housing 33 on the side remote from the mirror foot 1, determines the position of the mirror head in the driving position.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An exterior mirror system comprising:
   at least one mirror assembly including a mirror foot, a mirror head having a mirror housing to receive a mirror, the mirror housing having a passage opening with a flat and smooth surface of a border region of the passage opening, and a drive unit received by the mirror housing to drive the mirror head for movement relative to the mirror foot, the drive unit including:
   a motor,
   a drive sleeve extending through the mirror foot and the mirror head to connect the mirror foot to the mirror head, which defines an axis of rotation, and which axially moves the mirror housing along the axis of rotation and also rotate the mirror housing about the axis of rotation,
   a gearwheel concentrically received by the drive sleeve and driven by the motor,
   a drive foot concentrically received by the drive sleeve and connected to the mirror foot, the drive foot having annular extensions with contours axially extending upwardly and circumferentially distributed at a distal surface thereof which define recesses, and circumferential positioning extensions axially extending downwardly and which engage in the mirror foot, and a bracing ring concentrically received by the drive sleeve and which is axially displaceable along the axis of rotation and rotatable about the axis of rotation, the bracing ring having supporting contours which are directed towards the gearwheel and which correspond to the recesses of the annular extensions and the contours of the drive foot, and at least one latching element which rests on the flat and smooth surface of the border region of the passage opening, the bracing ring being guided in the annular extensions of the drive foot.

2. The exterior mirror system of claim 1, wherein the gearwheel has a projection that correspond to the supporting contours of the bracing ring.

3. The exterior mirror system of claim 1, wherein the at least one mirror assembly has a pair of detents to facilitate movement of the mirror head to a driving position.

4. The exterior mirror system of claim 3, wherein a first detent of the pair of detents comprises the supporting contours of the bracing ring and the projection of the first gearwheel.

5. The exterior mirror system of claim 3, wherein a first detent of the pair of detents is to lock the mirror head in a driving position, and includes an oblique surface of the supporting contours of the bracing ring, against which the projection of the gearwheel is supported.

6. The exterior mirror system of claim 3, wherein a second detent of the pair of detents comprises a latching element of the mirror foot, and a latching element of the mirror housing.

7. The exterior mirror system of claim 3, wherein a second detent of the pair of detents is to lift the mirror head by a release thereof the second detent in conjunction with a lift of the bracing ring by interaction of the supporting contours of the bracing ring and the contours on the annular extensions of the drive foot.

8. The exterior mirror system of claim 1, wherein the flat surface of the mirror housing is to move on a mating latching element of the mirror foot.

9. The exterior mirror system of claim 1, wherein the drive unit further includes guide elements arranged on the annular extensions of the drive foot and also on the bracing ring for relative axial and non-rotatable movement with respect to each other.

10. The exterior mirror system of claim 1, further comprising a compression spring concentrically received by the drive sleeve to press a respective mirror housing against the mirror foot.

11. The exterior mirror system of claim 1, further comprising a compression spring for the drive unit.

12. An exterior mirror system for a motor vehicle, comprising:
at least one mirror assembly including a mirror foot, a mirror head having a mirror housing to receive a mirror, the mirror housing having a passage opening with a flat and smooth surface of a border region of the passage opening, and a drive unit concentrically received by the mirror housing to drive the mirror head for movement relative to the mirror foot, the drive unit including:
an electric motor,
a drive sleeve defining an axis of rotation and which connects the mirror foot to the mirror housing so as to move the mirror housing vertically along the axis of rotation and also rotate the mirror housing about the axis of rotation
a gearwheel concentrically received by the drive sleeve and driven by the electric motor,
a drive foot concentrically received by the drive sleeve and connected to the mirror foot, the drive foot having annular extensions with contours circumferentially distributed at a distal surface thereof that define recesses,
a bracing ring concentrically received by the drive sleeve and engages around the annular extensions, the bracing ring being axially displaceable along the axis of rotation and rotatable about the axis of rotation, the bracing ring having supporting contours which are directed towards the gearwheel and which correspond to the recesses of the annular extensions and the contours of the drive foot, and at least one latching element which rests on the flat and smooth surface of the border region of the passage opening, the bracing ring being guided in the annular extensions of the drive foot, and
a bias mechanism concentrically received by the drive sleeve and which engages the drive sleeve so as to cause the mirror housing to engage the mirror foot.

13. The mirror system of claim 12, wherein the bias mechanism comprises a compression spring accommodated outside of a housing for the drive unit.

14. The exterior mirror system of claim 12, wherein the gearwheel has a projection that correspond to the supporting contours of the bracing ring.

15. The exterior mirror system of claim 12, wherein the at least one mirror has a pair of detents to facilitate movement of the mirror head to a driving position.

16. The exterior mirror system of claim 15, wherein a first detent of the pair of detents comprises the supporting contours of the bracing ring and the projection of the first gearwheel.

17. The exterior mirror system of claim 15, wherein a first detent of the pair of detents is to lock the mirror head in a driving position, and includes an oblique surface of the supporting contours of the bracing ring, against which the projection of the gearwheel is supported.

18. The exterior mirror system of claim 15, wherein a second detent of the pair of detents comprises a latching element of the mirror foot, and a latching element of the mirror housing.

19. The exterior mirror system of claim 15, wherein a second detent of the pair of detents is to lift the mirror head by a release thereof the second detent in conjunction with a lift of the bracing ring by interaction of the supporting contours of the bracing ring and the contours on the annular extensions of the drive foot.

20. An exterior mirror comprising:
a mirror foot;
a mirror housing to receive a mirror, the mirror housing having a passage opening with a flat and smooth surface of a border region of the passage opening; and
a drive unit concentrically received by the mirror housing to drive the mirror head for movement relative to the mirror foot, the drive unit having:
a drive sleeve defining an axis of rotation and which connects the mirror foot to the mirror housing so as to move the mirror housing vertically along the axis of rotation and also rotate the mirror housing about the axis of rotation, a gearwheel concentrically received by the drive sleeve and which is driven by the drive unit, a drive foot concentrically received by the drive sleeve and connected to the mirror foot, the drive foot having annular extensions with contours circumferentially distributed at a distal surface thereof which define recesses, and a bracing ring concentrically received by the first drive sleeve, and which has on an inner surface thereof inwardly directed guide elements which correspond to the recesses of the annular extensions to form axial guides with the recesses to connect the bracing ring to the drive foot for rotation therewith, supporting contours which are directed towards the gearwheel and which correspond to the depressions of the annular extensions and the contours of the drive foot, and at least one latching element which rests on the flat and smooth surface of the border region of the passage opening, the bracing ring being guided in the annular extensions of the drive foot.

* * * * *